(12) United States Patent
Liakathali et al.

(10) Patent No.: US 11,916,748 B2
(45) Date of Patent: Feb. 27, 2024

(54) COMPUTERIZED METHOD AND SYSTEM FOR NETWORK USAGE ANALYSIS AND FORECASTING

(71) Applicant: VERIZON PATENT AND LICENSING INC., Basking Ridge, NJ (US)

(72) Inventors: Sheikbharith Liakathali, Frisco, TX (US); Rajat Sharma, Southlake, TX (US); Senthil Muthusamy, Frisco, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/858,111

(22) Filed: Jul. 6, 2022

(65) Prior Publication Data
US 2024/0015075 A1 Jan. 11, 2024

(51) Int. Cl.
*G06F 15/16* (2006.01)
*H04L 41/14* (2022.01)
*H04W 48/16* (2009.01)
*H04L 41/12* (2022.01)

(52) U.S. Cl.
CPC .............. *H04L 41/14* (2013.01); *H04L 41/12* (2013.01); *H04W 48/16* (2013.01)

(58) Field of Classification Search
CPC ......... H04L 41/14; H04L 41/12; H04W 48/16
See application file for complete search history.

(56) References Cited

U.S. PATENT DOCUMENTS

| | | | |
|---|---|---|---|
| 11,411,842 B1* | 8/2022 | Delahunt | H04L 41/5061 |
| 2016/0286409 A1* | 9/2016 | Kravets | H04W 24/02 |
| 2016/0323163 A1* | 11/2016 | Abdulnour | H04L 12/66 |
| 2019/0297520 A1* | 9/2019 | Vedam | H04L 47/83 |
| 2022/0322104 A1* | 10/2022 | Bender | H04W 16/18 |

\* cited by examiner

*Primary Examiner* — Padma Mundur

(57) ABSTRACT

Techniques for network usage analysis and forecasting are disclosed. In one embodiment, a computerized method is disclosed comprising obtaining network access data identifying network access of a plurality of users, obtaining user data for the plurality of users, analyzing the obtained network access data, the analyzing comprising determining a network usage pattern for each user, determining a plurality of feature sets corresponding to the plurality of users, a feature set determined for a respective user comprising network usage features and user features determined using the user data obtained for the respective user, determining a number of clusters formed using the plurality of feature sets, each cluster grouping a number of users, of the plurality of users, having similar feature sets, and communicating information about at least one cluster in response to a network analysis request.

19 Claims, 10 Drawing Sheets

COMPUTERIZED METHOD AND SYSTEM FOR NETWORK USAGE ANALYSIS AND FORECASTING

BACKGROUND INFORMATION

A service area of a telecommunications network, such as the 5G (Fifth Generation) communications network, can be divided into geographic areas, or cells. Each cell can include radio access network (RAN) equipment, such as a cellular base station (or cell tower), to which wireless devices (e.g., UEs) within the cell's geographic area can communicate to access services, such as and without limitation the Internet, telephone network, and the like.

DETAILED DESCRIPTION OF EXAMPLE EMBODIMENTS

Techniques for network usage analysis and forecasting are disclosed. Disclosed embodiments provide a dynamic mechanism for grouping users with similar network usage patterns and other characteristics. Embodiments of the present disclosure can be used for, inter alia, network resource forecasting and deployment, product and/or service promotion, or the like.

While embodiments of the present disclosure are described herein in connection with a cellular network, the present disclosure can be practiced with other types of networks and/or telecommunications networks.

In accordance with one or more embodiments, network (e.g., cellular network) access data for a corpus of users and a given time frame can be used to determine a network usage pattern for each user.

In addition, user data can be obtained for each of the users. By way of a non-limiting example, the user data can comprise information and characteristics about a user, such as and without limitation, contact information (e.g., name, mailing address(es), phone number(s), email address(es)), UE information (e.g., device make, model, serial number, configuration, etc.), user interests, demographic information (e.g., age, gender, employment, education, income, marital status, etc.), and the like.

A feature set can be determined for each user using the obtained access data and user data. A user's feature set can comprise network usage features and user features. The feature set determined for each user can be used to form a number of clusters, each cluster representing a number of users with similar feature sets. Information about one or more clusters can be communicated and used for dynamic network resource forecasting and deployment, promotional efforts, etc.

Figure 1:
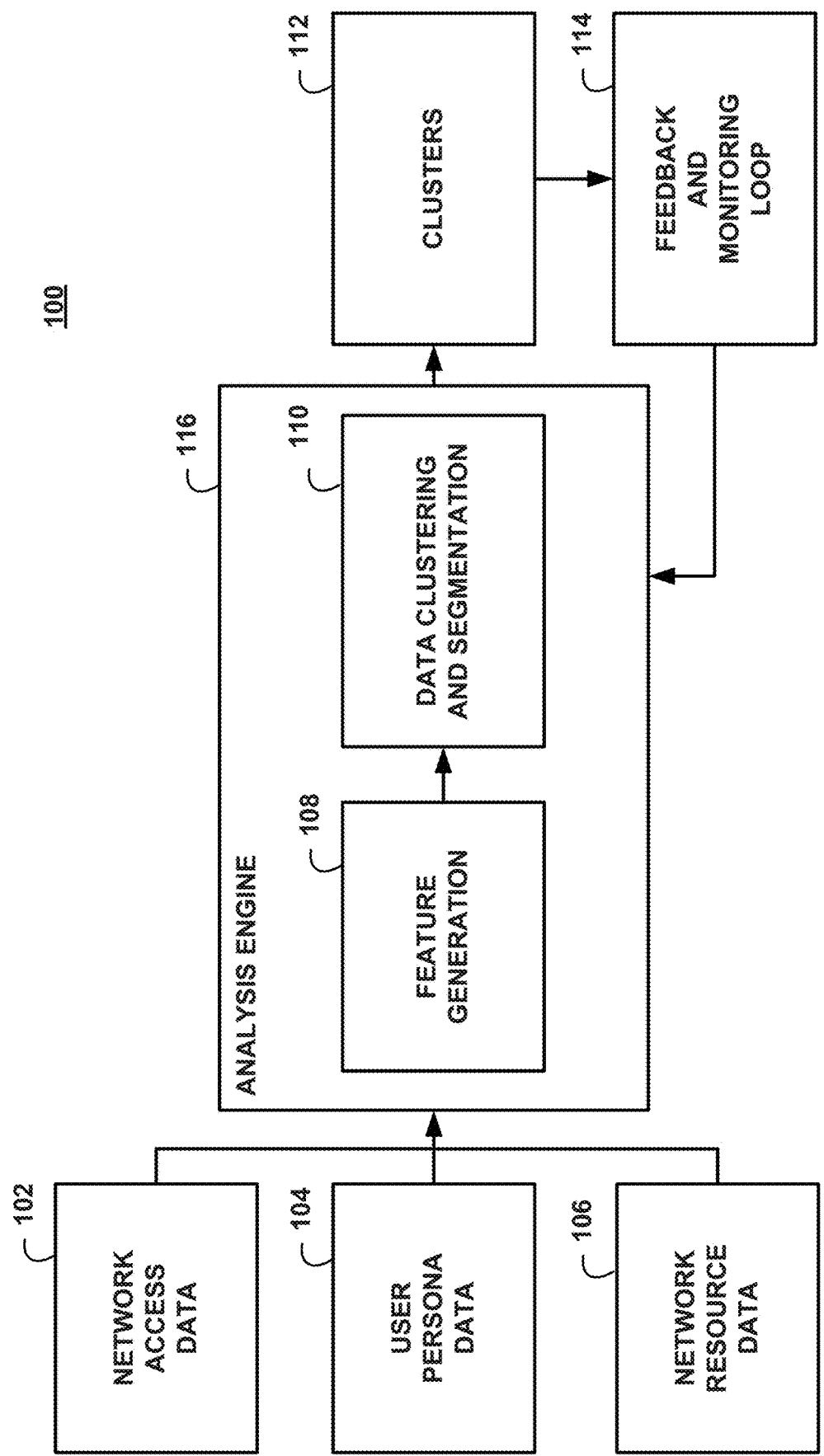
FIG. 1 provides an example illustrating components for use in analyzing network usage and user data in accordance with one or more embodiments of the present disclosure.

FIG. 1 provides an example illustrating components for use in analyzing network usage and user data in accordance with one or more embodiments of the present disclosure. Example 100 includes an analysis engine 116 comprising a feature generation module 108 and a data clustering and segmentation module 110. Feature generation module 108 can receive network access data 102, user data 104 and network resource data 106.

In accordance with one or more embodiments, network access data 102 can comprise data about each network access, such as and without limitation voice (e.g., call), data, etc. network accesses. By way of a non-limiting example, data about a network access (e.g., a call) can comprise the date and time the call started and ended, caller and recipient identification information (e.g., telephone number), and the originating and termination cell towers, connection frequency, etc. While embodiments of the present disclosure are described in connection with call data, other network usage data, such as data and content communications can also be used.

In accordance with one or more embodiments, user data 104 can comprise information about a given user. By way of some non-limiting examples, user data 104 (alternately referred to as persona data or information) can comprise information about a user (e.g., subscriber, consumer, entity, etc.) accessing the network. User data 104 can comprise contact information (e.g., name, mailing address(es), phone number(s), email address(es)), online account information (e.g., username and password), and information (e.g., make, model, serial number, features, configuration, etc.) about each UE of the user. User data 104 can include demographic information, such as and without limitation, age, gender, employment, education, income, marital status, and the like. In addition, user data 104 can comprise information identifying a user's interests (e.g., sports, outdoor enthusiast, gaming, social enthusiast, music, technology, social networking influencer, etc.).

In accordance with one or more embodiments, network resource data 106 can comprise information about an access network (e.g., a Radio Access Network, or RAN) of the cellular network. In accordance with one or more embodiments, the access network can comprise a cellular access network, for example, a fifth-generation (5G) network, fourth-generation (4G) network.

The access network can be accessed by users using UEs. In accordance with one or more embodiments, UEs can be any computing device capable of communicating with the access network. By way some nonlimiting examples example, a UE can be any device equipped with a cellular or wireless or wired transceiver, such as and without limitation a mobile phone, tablet, laptop, sensor, Internet of Things (IoT) device, autonomous machine, wired device, wireless handset, and the like.

The access network can be communicatively coupled to one or more other networks, such as and without limitation a core network (which can be owned and/or operated by a wireless telecommunications network operator) providing wireless connectivity to UEs via a radio (or air) interface of the access network. By way of a non-limiting example, voice and data services (e.g., calls, text messaging, content streaming, and the like) can be provided to UEs by a wireless telecommunications network operator via the access and core networks.

By way of a non-limiting example, the access network can comprise a NextGen Radio Access Network (NG-RAN), a 5G New Radio (5G NR), etc. The access network uses radio frequencies (or frequency ranges, or bands) for transmitting digital information. Each radio frequency range, or band, is delimited by a lower frequency and an upper frequency. C-band is an example of a frequency band that operates in a mid-band spectrum frequency (between 3.7 and 4 GHz). Telecommunications network operators are using C-band to deploy 5G technology and achieve significant improvements in digital transmission speeds and latencies over other access network technology.

The access network can comprise a plurality of base stations communicatively connected to the UEs (e.g., via a radio interface of the cellular access network). One or more base stations can be used to service a geographic region referred to as a cell. Further details of a cellular network that can be used in accordance with one or more embodiments are provided in FIGS. 7-9.

Network resource data 106 can comprise information about each base station, including without limitation a base station's geographic location, configuration, features, etc.

In accordance with one or more embodiments, network access data 102, user data 104 and network resource data 106 can be input to feature generation module 108. By way of a non-limiting example, feature generation module 108 can use the input to generate data for use by data clustering and segmentation module 110. In accordance with one or more embodiments, feature generation module 108 can generate a feature set for each of a plurality of users.

Figure 2:
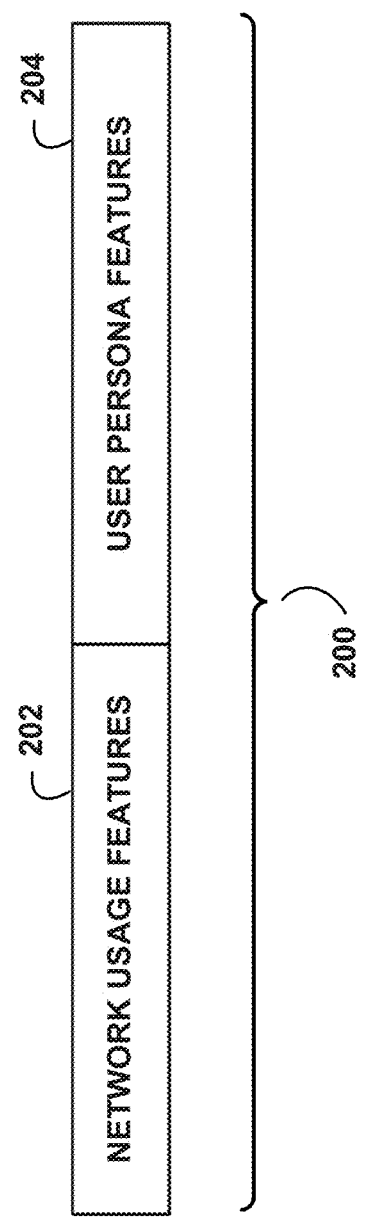
FIG. 2 provides an example of types of features of a feature set in accordance with one or more embodiments of the present disclosure.

FIG. 2 provides an example of types of features of a feature set in accordance with one or more embodiments of the present disclosure. As shown in FIG. 2, feature set 200 can comprise network usage features 202 and user features 204. In accordance with one or more embodiments, a feature set 200 can be determined for each user with network access data 102 and user data 104. As is discussed in more detail below, a user's network access data 102 and user data 104 can be used to determine the user's network usage features 202 and user features 204, respectively, as is discussed in more detail below.

Referring again to FIG. 1, data clustering and segmentation module 110 can use the feature sets generated by feature generation module 108 to form feature set clusters (e.g., clusters 112). Each feature set cluster can group a number of similar feature sets (and corresponding users having similar feature sets).

Figure 3:
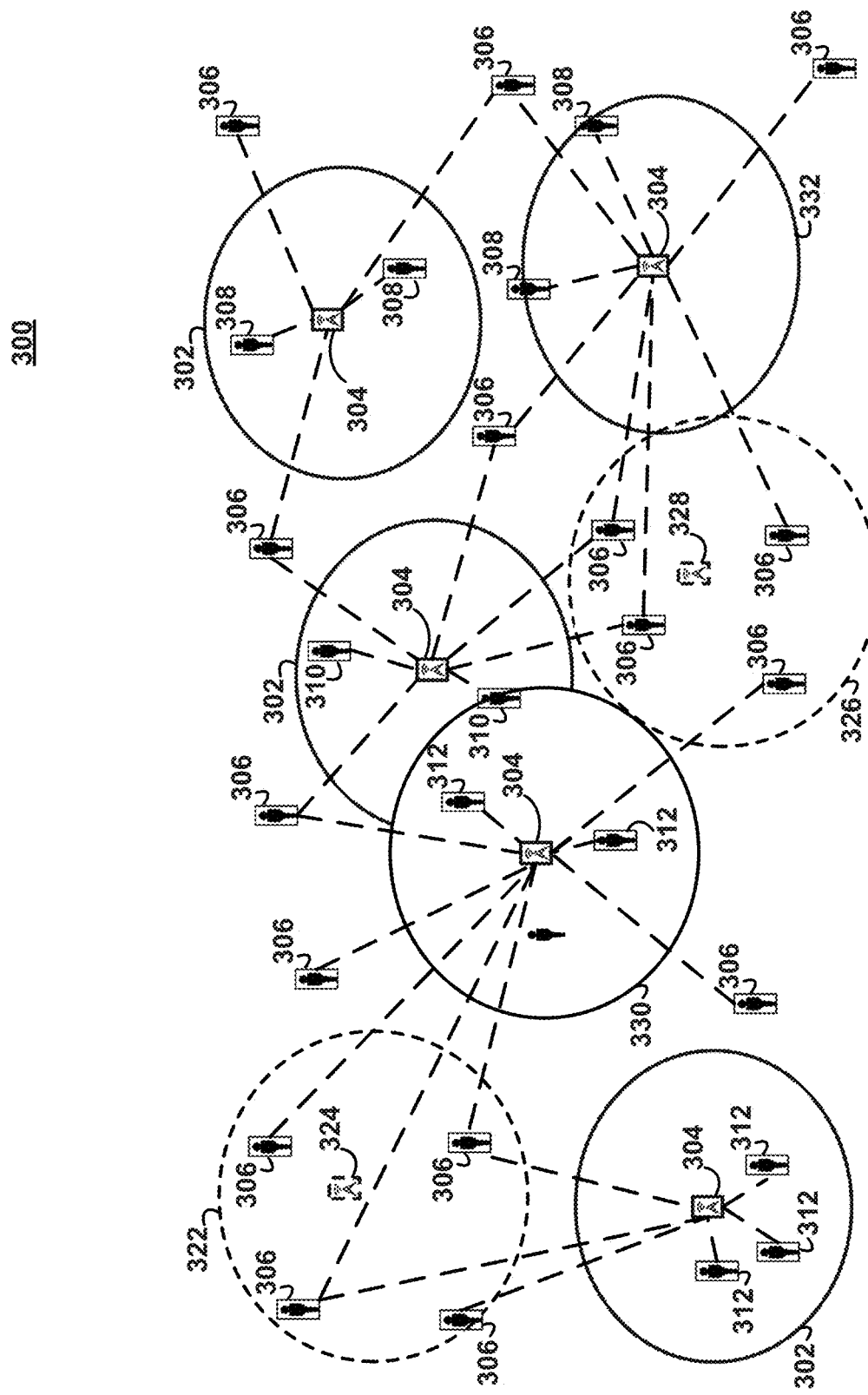
FIG. 3 provides a graphical representation of network usage in connection with network resources in accordance with one or more embodiments of the present disclosure.

With reference to FIG. 1, network access data 102 can comprise information about each network access (e.g., cellular call) for a given time frame, and network resource data 106 can comprise information about the access network (e.g., information about each base station in the access network). FIG. 3 provides a graphical representation of network usage in connection with network resources (of an access network) in accordance with one or more embodiments of the present disclosure.

Example 300 of FIG. 3 includes a number of base stations 304 (each having corresponding data in network resource data 106) capable of receiving and transmitting signals to a number of UEs. Network access data 102 includes information about each network access 306, 308, 310 and 312 by a user using a UE. Each network access 306, 308, 310 and 312 has a corresponding geographic location (e.g., a geographic location at the start, end of the access, and/or during the network access). In addition, in accordance with embodiments of the present disclosure, each network access 306, 308, 310 and 312 is associated with a given user and the user's demographic information in user data 104.

In accordance with one or more embodiments, a distance between the geographic location of a base station 304 being accessed and the geographic location of the UE accessing the base station 304 can be determined. In the example 300, each distance is shown by a dotted line.

Each base station 304 in example 300 has a corresponding geographic area 302. In the example 300, while geographic area 302 is shown as a circular area, geographic area 302 can be any shape. In accordance with one or more embodiments, geographic area 302 can have associated regions, each of which can provide a level of coverage, or access. By way of a non-limiting examples, two regions within geographic area 302 can be referred to as "near" and "mid" regions, a region corresponding to an edge portion of geographic area 302 can be referred to as "far" region, and a region outside geographic area 302 can be referred to as an "outer" region. In example, 300, each region is given a reference numeral representing its associated region. While only near, mid and far regions are discussed herein, varying degrees of gradation are contemplated herein, and the degrees and groups of classifications are configurable.

In accordance with one or more embodiments, the region associated with a network access (relative to a given base station 304) can be determined based on a distance determined using the geographic location associated with the network access and the geographic location associated with the base station. The region can be determined for a network access using the determined distance and a set of distance thresholds corresponding to the base station's associated regions. By way of a non-limiting example, the "near" region (which includes each network access 312) can have an associated first distance threshold, the "mid" region (including each network access 310) can have an associated second distance threshold, and the "far" region (including each network access 308) can have an associated third distance threshold. The third distance threshold is greater than the second distance threshold, which is greater than the first distance threshold. A network access with a determined distance (from a given base station) exceeding the third distance threshold can correspond to a base station's "outer" region.

By way of a further non-limiting example, in example 300, each network access 312 is associated with the "near" region of geographic area 302 (of a base station 304) and has a determined distance that satisfies the first distance threshold (e.g., the determined distance is less than or equal to a first distance threshold), each network access 310 is associated with the "mid" region and has a determined distance that exceeds the first distance threshold and satisfies the second distance threshold (e.g., the determined distance is greater than the first distance threshold and less than or equal to the second distance threshold), and each network access 308 is associated with the "far" region and has a determined distance that exceeds both the first and second distance thresholds and satisfies the third distance threshold (e.g., the determined distance is greater than the first and second distance thresholds and is less than or equal to the third distance threshold. Each network access 306 has a determined distance that exceeds the first, second and third distance thresholds.

In example 300, network accesses 306 are the farthest away from a base station 304, network accesses 308 are the next farthest away, network accesses 310 are the next farthest and network accesses 312 are the closest to a base station 304. As is discussed below, a UE's distance from a base station 304 can impact the services and/or the quality of the services provided by the access network (and core network).

While distance is used herein in determining a region, it should be apparent that other information, such as direction, can be used in determining a region. By way of a non-limiting example, a region can correspond to a distance from the base station and a direction (e.g., north, south, east or west). By way of a further non-limiting example, a region, such as the "far" region, can be broken into a number of regions based on both distance and direction (e.g., "far, west" region, etc.).

By way of a non-limiting example, geographic area 302 can represent an area in which 5G C-band coverage (enabling a corresponding type of access to the access network by users) is available. By way of another nonlimiting example, geographic area 302 can represent an area within which the signal quality between the base station 304 and a UE is considered to be acceptable (e.g., a strong signal). As a UE moves farther away from the base station 304, signal strength can degrade resulting in bad connections, dropped connections, slower data transmissions, etc. By way of a non-limiting example, 5G C-band may not be available in the outer region(s) associated with a base station 304.

In accordance with one or more embodiments, network accesses such as those shown in example 300 can be used to identify potential future locations for additional base stations 304. By way of a non-limiting example, in example 300, base station 324 can be a new base station (e.g., planned or added) to provide additional coverage for geographic area 322 in order to support (or service) network accesses 306 (in the top left corner of the drawing) farthest from any existing base station 304.

By way of a further nonlimiting example, the network accesses shown in example 300 can be used to identify limited network accesses within a geographic area 332 (bottom, left in example 300) serviced by the corresponding base station 304. For example, there is an absence of network accesses 312 and 310 (e.g., the two closest types of network accesses). The closest network access is network accesses 308 at the edge of the geographic area 332. In accordance with one or more embodiments, one or more new base stations (e.g., base station 328) can be added to service network accesses 306 and/or 308 (within geographic area 326). Embodiments of the present disclosure can be used to identify geographic area 332 for inclusion in a promotional campaign.

In accordance with one or more embodiments, each network access 306, 308, 310 and 312 can have associated demographic information, which can be used in determining additional locations for new base stations. By way of a non-limiting example, the geographic location(s) for one or more additional base stations can determined in conjunction with a campaign to target certain users belonging to a demographic group, such as and without limitation users having a particular interest (e.g., an interest in sports, outdoor activities, social influencers, etc.).

In example 300, demographic information associated with the users corresponding to the network accesses 306 within geographic area 326 can be used in a determination to add base station 328 to service geographic area 326.

In accordance with one or more embodiments, the information shown in example 300 can be used to determine network resource capacity for purposes of determining whether an additional base station is needed to serve the number of network accesses. For example, while geographic area 330 is serviced by a base station 304, embodiments of the present disclosure can be used to provide network usage and user data for use in determining whether or not to install an additional base station to provide additional network resource capacity.

Figure 4:
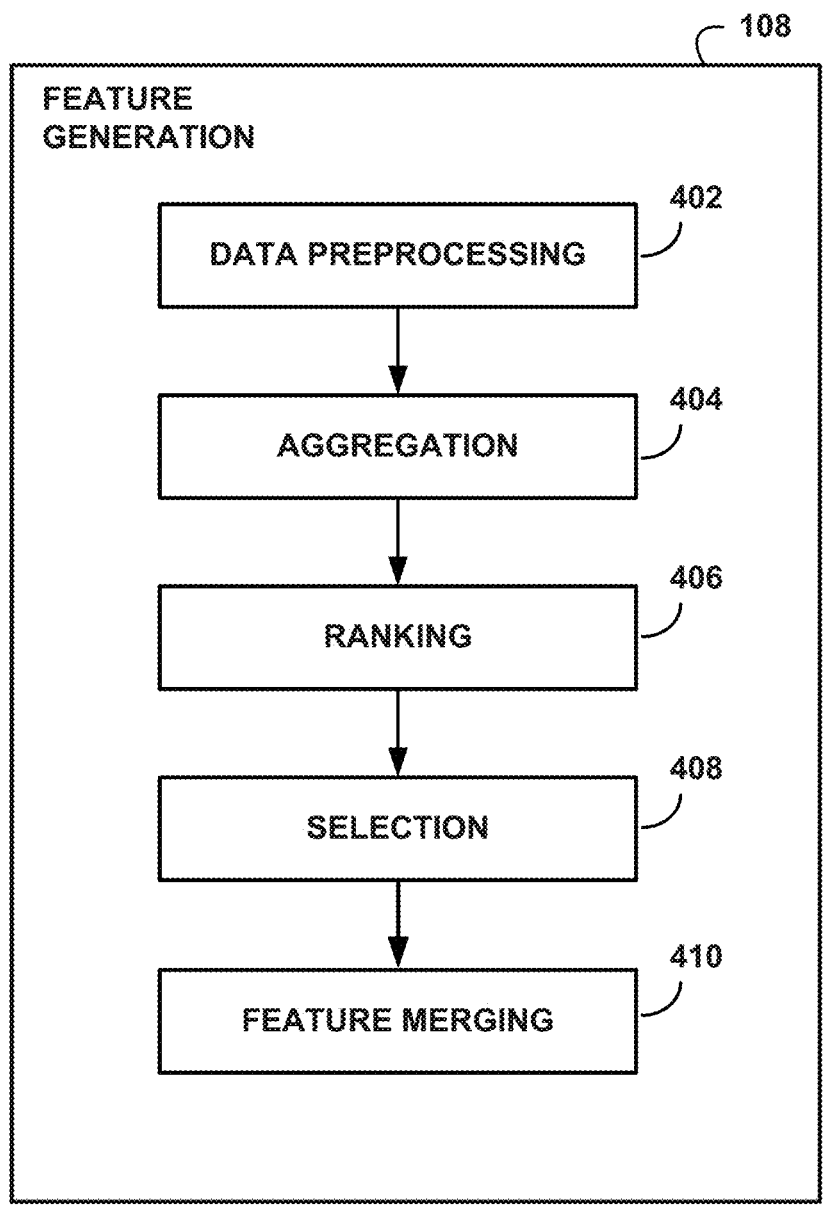
FIG. 4 provides examples of modules of a feature generation module in accordance with one or more embodiments of the present disclosure.

Referring again to FIG. 1, the network access data 102, user data 104 and network resource data 106 can be used by feature generation module 108 to generate feature set 200 for each user. In accordance with one or more embodiments, the feature set 200 generated for each user can be used (e.g., by data clustering and segmentation module 110) to generate clusters 112 of users. FIG. 4 provides examples of modules of feature generation module 108 in accordance with one or more embodiments of the present disclosure.

In example 400 shown in FIG. 4, feature generation module 108 can comprise a data preprocessing module 402. Data preprocessing module 402 can be configured to provide data cleansing and integration functionality to identify missing, or incomplete, data, and obtain values to fill in the missing data.

Data processing module 402 can include functionality to encode categorical data using one-hot encoding. Categorical data is typically data that can take on a limited number of values. One-hot encoding can be used to represent the values using a binary vector, each bit representing one of the values, and the value of the bit indicating whether or not the value is present in the data.

For example, one-hot encoding can be used to represent the interest(s) of a user. Each bit in a binary vector representing a user's interests can correspond to a particular interest, and the value of the bit can indicate whether or not the user has the particular interest.

In accordance with one or more embodiments, data preprocessing module 402 can include functionality to normalize, or standardize, feature data, such that the same scale can be used in connection with some or all of the feature data. Data preprocessing module 402 can include functionality to exclude user data in accordance with opt-out data preferences specified by any user, and to provide data masking to remove user identify information. By way of a non-limiting example, an MD5 message digest algorithm can be used to mask any user identity information.

By way of yet another non-limiting example, data preprocessing module 402 can include functionality to filter out unwanted data. For example, embodiments of the present disclosure can be used in connection with a certain type of coverage, such as and without limitation 5G C-band coverage. In such a case, functionality of data preprocessing module 402 can be used to exclude any network access data 102, user data 104 and/or network resource data 106 unrelated to 5G C-band coverage.

In accordance with one or more embodiments, aggregation module 404 (of feature generation module 108) can use network access data 102 to determine network usage patterns. By way of a non-limiting example, aggregation module 404 can determine a time spent value for each region associated with a geographic area (e.g., geographic area 302). In accordance with one or more embodiments, aggregation module 404 can use the distance determined for each network access of a user. Aggregation module 404 can determine a time spent for each network access, group the network accesses by region and determine an aggregate time spent for each region using the determined region groupings.

Figure 5:
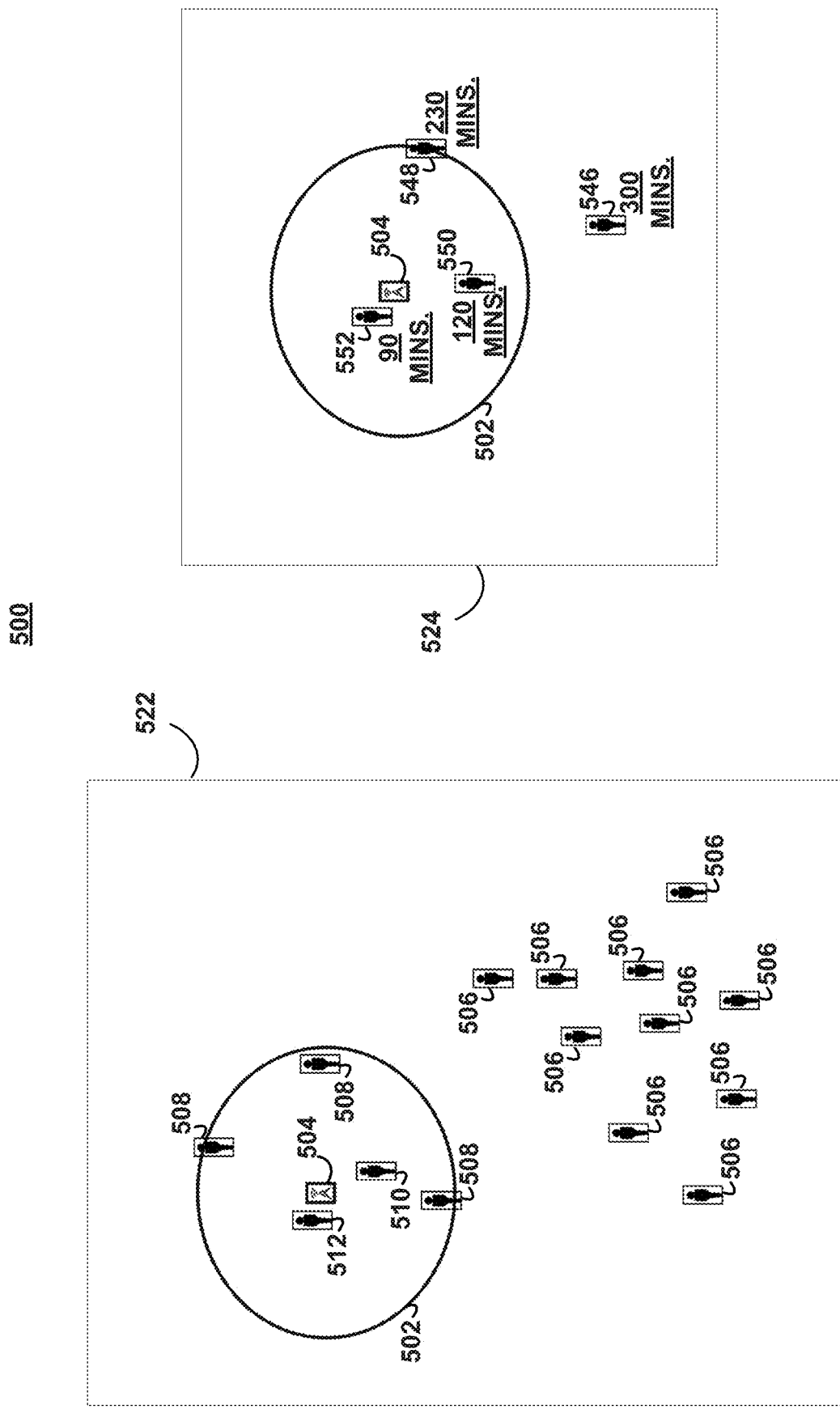
FIG. 5 provides an exemplary illustration of network access aggregation and usage pattern determination in accordance with one or more embodiments.

FIG. 5 provides an exemplary illustration of network access aggregation and usage pattern determination in accordance with one or more embodiments. For simplicity sake, one base station (base station 504) is used in example 500. It should be apparent that a user can access any number of base stations.

Scenario 522, in example 500 of FIG. 5, depicts a user's network accesses in connection with base station 504 and a given time frame. As with the network accesses shown in example 300 (of FIG. 3), each network access has a corresponding reference number 506, 508, 510 and 512 (corresponding to reference numerals 306, 308, 310 and 312, respectively).

In example 500 (of FIG. 5) each network access 512 corresponds to a "near" region, each network access 510 corresponds to a "mid" region, each network access 508 corresponds to a "far" region and each network access 506 corresponds to an "outer" region of geographic area 502 of base station 504. As discussed, the region associated with a network access can be based on the distance determined for the network access and the distance thresholds associated with the subregions (of geographic area 502 of base station 504).

In example 500, network accesses 512 represent network access closest to base station 504 (e.g., in accordance with a first distance threshold), network accesses 510 can represent those network accesses that are next closest to base station 504 (e.g., determined using the first and second distance thresholds), network accesses 508 are the next closest to base station 504 (e.g., determined using second and third distance thresholds), and network accesses 506 represent network access that are the farthest from base station 504 (e.g., determined using the third distance threshold).

Aggregation module 404 can determine a time spent value for each of the "outer," "far," "mid" and "near" regions associated with geographic area 502 of base station 504. In accordance with one or more embodiments, aggregation module 404 can group a user's network accesses into respective regions and determine an aggregate time spent for each region. Each grouping and associated aggregate time spent can represent a user's network usage pattern corresponding to a respective region of base station 504.

Scenario 524 (of FIG. 5) shows network usage patterns 546, 548, 550 and 552 corresponding (respectively) to the "outer," "far," "mid" and "near" regions associated with base station 504. Each network usage pattern 546, 548, 550 and 552 has a respective aggregate time spent value determined by aggregation module 404.

Referring again to FIG. 4, in accordance with one or more embodiments, ranking module 406 (of feature generation module 108) can rank each user's network usage patterns 546, 548, 550 and 552 based on their respective aggregate time spent values.

With reference to scenario 524 (of FIG. 5), using their respective aggregate time spent values, network usage pattern 546 (corresponding to the "outer" region of base station 504) is ranked first with the others ranked as follows: network usage pattern 548 (corresponding to the "far" region of base station 504), followed by network usage pattern 550 (corresponding to the "mid" region of base station 504), followed by network usage pattern 552 (corresponding to the "near" region of base station 504).

As is shown in scenario 524, the greatest aggregate time spent value by the user is associated with the "outer" region of base station 504, and the next most aggregate time spent value is associated with the "far" region. In other words, with respect to base station 504, the user is accessing the network primarily from outside, or near the edge, of geographical area 502 of base station 504. As discussed, quality of service issues (e.g., bad/dropped connections, slower transmissions, etc.) are more likely to occur farther from base station 504.

Referring again to FIG. 4, selection module 408 (of feature generation module 108) can be configured to select at least one network usage pattern for each user based on the usage pattern rankings determined by ranking module 406. With reference to FIG. 5, selection module 408 can be configured to select one or more network usage patterns 546, 548, 550 and 552 based on ranking determined by ranking module 406. By way of one non-limiting example, network usage pattern 546 (associated with the greatest aggregate time spent value) can be selected by selection module 408.

In accordance with one or more embodiments, selection module 408 can be configured to filter out users whose greatest aggregate time spent value is less than a threshold aggregate time spent.

Feature merging module 410 (of feature generation module 108) can be used to generate a feature set for each user for whom at least one network usage pattern is selected by selection module 408.

In accordance with one or more embodiments, feature merging module 410 can comprise PCA (Principal Component Analysis) functionality to determine representative features (e.g., to select features representative of the underlying data) across the user population. By way of a non-limiting example, PCA can be used to select representative user data. With reference to FIG. 2, each feature set determined for a user comprises network usage features 202 and user features 204. In accordance with one or more embodiments, PCA can be used to select the information (from the user data 104) used to generate the user features 204.

In accordance with one or more embodiments, network usage features 202 can be based on the network usage pattern(s) selected by selection module 408. In accordance with one or more such embodiments, each selected network usage pattern can comprise an aggregate time spent value associated with a region of a base station along with information identifying the base station. In accordance with one or more embodiments, network usage features 202 can comprise, for each selected aggregate time spent value, information about a corresponding base station and a region corresponding to the base station.

Referring again to FIG. 1, the feature set generated for each of a number (or corpus) of users by feature generation module 108 can be provided to data clustering and segmentation module 110. In accordance with one or more embodiments, module 110 can form a number of clusters using the feature set data determined (by feature merging module 410) for each user.

In accordance with one or more embodiments, module 110 can use a partitioning-based approach to form the feature set clusters, or groupings. The partitioning-based approach can be an unsupervised machine learning approach, such as k-means clustering. Feature set similarity can be used to form feature set groupings, or clusters.

Feature sets that are grouped together are more similar to each other than they are other features used to form other groups.

By way of a non-limiting example, k-means clustering can use an iterative process to form a number, k, clusters. The value of k can be based on a determined variance in the cluster data. By way of a further non-limiting example, WCSS (Within Cluster Sum of Square, or Elbow Method) can be used to determine the value of k given the features sets generated by feature generation module 108.

In accordance with one or more embodiments, data clustering and segmentation module 110 can determine a data point, or centroid, representing a center of each cluster. Module 110 can identify the centroid (corresponding to one of the clusters) that is closest to a feature set, and assign the feature set to the corresponding cluster. Module 110 can assign each feature set to one of the clusters.

In accordance with one or more embodiments, feedback and monitoring loop 114 can be used by analysis engine 116 to monitor performance metrics (e.g., precision, accuracy, recall, sum of squared errors, etc.) and optimize the learning process based on the performance metrics.

Figure 6:
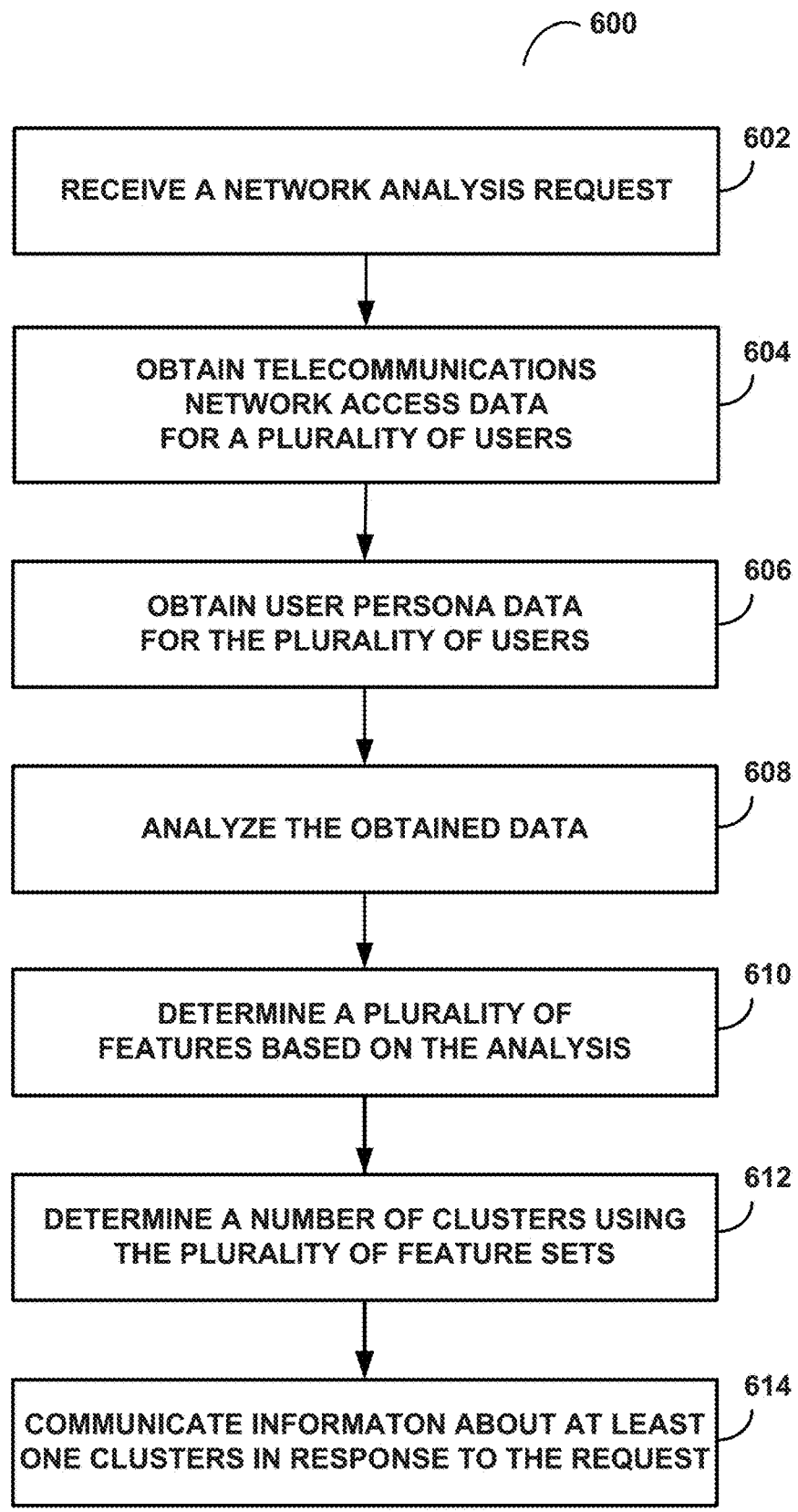
FIG. 6 provides a network usage and user data analysis process flow in accordance with one or more embodiments of the present disclosure.

FIG. 6 provides a network usage and user data analysis process flow in accordance with one or more embodiments of the present disclosure. In accordance with one or more embodiments, exemplary process 600 of FIG. 6 can be performed by analysis engine 116. According to exemplary process 600, network resource data (e.g., network resource data 106) associated with an access network of a telecommunications network, network access data (e.g., network access data 102) associated with a corpus of users and a given time frame and information about each user (e.g., user data 104) can be used to generate a feature set for each user. Process 600 can generate a number of feature set groupings, or clusters, using the feature sets generated for the corpus of users. Each feature set can be assigned to one of the clusters. Each cluster can be represented by a centroid (e.g., a center point of the cluster).

At step 602, a network analysis request can be received. In accordance with one or more embodiments, the network analysis request can be received by analysis engine 116. By way of a non-limiting example, the request can be a request for information about one or more feature set clusters.

At step 604, telecommunications network access data can be attained for a plurality of users. By way of a non-limiting example the network access data can be network access data 102. Network access data 102 can comprise data about each network access, such as and without limitation voice (e.g., call), data, etc. network accesses. By way of a non-limiting example, data about a call can comprise the date and time the call started and ended, caller and recipient identification information (e.g., telephone number), and the originating and termination cell towers, connection frequency, etc. As discussed, network access data 102 need not be limited to call data.

At step 606, user data can be obtained for the plurality of users. In accordance with one or more embodiments, the user data can be user data 104 and comprise information about each user of the plurality of users. By way of some non-limiting examples, user data 104 can comprise information about a user, information about each UE of the user and include demographic information, user's interests (e.g., sports, outdoor enthusiast, gaming, social enthusiast, music, technology, social networking influencer, etc.), and the like.

At step 608, the obtained data can be analyzed. At step 610, a plurality of features can be determined based on the analysis. In accordance with one or more embodiments, steps 608 and 610 can be performed by modules 402, 404, 406, 408 and 410 of feature generation module 108.

In accordance with one or more embodiments, the network access data 102 can be analyzed in connection with network resource data 106 (comprising information about an access network, such as for example a RAN, of the telecommunications network). Network resource data 106 can comprise information about the access network's resources (e.g., each base station). By way of a non-limiting example, network resource data 106 can include information about each base station of the access network.

In accordance with one or more embodiments, a network usage pattern can be determined for each user in the analysis, at step 608. By way of a non-limiting example, a user's network usage pattern can comprise information about a representative pattern of usage of a user. As discussed herein, a number of network usage patterns determined for a given user can be ranked. The ranking can be used to select at least one of the determined network usage patterns as being representative of the user's pattern of usage of the access network.

By way of a non-limiting example, the plurality of features determined (at step 610 by feature generation module 108) based on the analysis (performed at step 608 by feature generation module 108) can be feature set 200 comprising network usage features 202 and user features 204. In accordance with one or more embodiments, network usage features 202 can be based on the selected network usage pattern(s) determined at step 608, and the user features can be based on the user data 104 obtained at step 606. In accordance with one or more embodiments, network usage features 202 can comprise, for each selected aggregate time spent value, information about a corresponding base station and a region corresponding to the base station.

In accordance with one or more embodiments, PCA can be used to select the information (from the user data 104) used to generate the user features 204. In accordance with one or more embodiments, network usage features 202 can be based on the usage pattern(s) selected by selection module 408. In accordance with one or more such embodiments, each selected usage pattern can comprise an aggregate time spent value and associated region and base station information.

At step 612, a number of clusters can be determined using the plurality of feature sets. By way of a non-limiting example, the feature set generated (at step 610 by feature generation module 108) for each user of the plurality of users can be provided to data clustering and segmentation module 110. In accordance with one or more embodiments, module 110 can form a number of clusters using the feature set 200 generated for each user of the plurality of users. In accordance with one or more embodiments, module 110 can use a partitioning-based approach to form the feature set clusters, or groupings. The partitioning-based approach can be an unsupervised machine learning approach, such as k-means clustering.

Feature set similarity can be used to form feature set groupings, or clusters. Feature sets that are grouped together are more similar to each other than they are other features used to form other groups.

By way of a non-limiting example, k-means clustering can use an iterative process to form a number, k, clusters. The value of k can be based on a determined variance in the cluster data. By way of a further non-limiting example, WCSS (Within Cluster Sum of Square, or Elbow Method) can be used to determine the value of k given the features sets generated by feature generation module 108.

In accordance with one or more embodiments, data clustering and segmentation module 110 can determine a data point, or centroid, representing a center of each cluster. Module 110 can identify the centroid (corresponding to one of the clusters) that is closest to a feature set, and assign the feature set to the corresponding cluster. Module 110 can assign each feature set to one of the clusters.

At step 614, information about at least one cluster can be communicated in response to the request. By way of a non-limiting example, the analysis engine 116 can receive the network analysis request (at step 602) and communicate information about at least one cluster in response to the received network analysis request (at step 614).

In accordance with one or more embodiments, the clusters can be used for network resource deployment, network resource promotion, etc. The network analysis request can be a request for each cluster including the feature information associated with reach cluster. In accordance with one or more embodiments, the feature information can comprise information about the cluster's centroid representative of each of the feature sets assigned to the cluster. In accordance with one or more embodiments, the feature information can include information associated with at least some of the feature sets alone or in combination with the cluster's centroid.

In accordance with one or more embodiments, the request received (at step 602 of FIG. 6) can include criteria for selecting one or more clusters by analysis engine 116. By way of a non-limiting example, the network analysis request received (at step 602 of FIG. 6) can comprise a request for one or more clusters representing feature sets with network usage features 202 generated using network usage pattern 546 and/or 548. By way of a further non-limiting example, the analysis engine 116 can generate a response (at step 614) comprising information about one or more clusters satisfying the selection criteria in response to the request. The cluster information provided by analysis engine 116 can comprise information identifying one or more geographic areas associated with network usage pattern 546 and/or 548. The information communicated (at step 614 of FIG. 6) can identify at least one geographic area for a new base station.

In accordance with one or more embodiments, the request received (at step 602 of FIG. 6) can include user data as selection criteria, such as and without limitation user device information, user interest(s), etc. In accordance with one or more embodiments, the request can include both network usage and user data as selection criteria. By way of a non-limiting example, the request include at least one user interest and a network usage pattern, and the response communicated by analysis engine 116 can include information about each cluster satisfying the user interest and network usage pattern.

By way of a further non-limiting example, one or more of the base stations of the access network can provide 5G C-band, and the request received (at step 602 of FIG. 6) can be a request to identify geographic areas (corresponding to network usage pattern 546 and/or 548) for deploying new 5-G, C-band enabled base stations. The request can include user data as selection criteria (e.g., user interest, user device information, user demographic information, etc. criteria). The response communicated by analysis engine 116 can include information about each cluster satisfying the criteria. The user data cluster information can be used in combination with the network usage cluster information for prioritizing deployment of access network resources (e.g., new base stations).

By way of a further non-limiting example, one or more of the base stations of the access network can provide 5G, C-band access, and the request received (at step 602 of FIG. 6) can be a request to identify geographic areas (corresponding to network usage pattern 550 and/or 552) for promoting existing and/or new 5-G, C-band enabled base stations. The request can include user data as selection criteria (e.g., user interest, device information, demographic criteria, etc.). The response communicated by analysis engine 116 can include information about each cluster satisfying the criteria. The user data cluster information can be used in combination with the network usage cluster information for developing a campaign to target users with network usage patterns within the identified geographic area(s). By way of a non-limiting example, the promotion campaign can comprise a campaign promoting 5-G, C-band enabled UEs directed to users identified in the response communicated by analysis engine 116.

By way of a further non-limiting example, a cluster formed from features sets indicating an interest in sports might be used for a campaign promoting products (e.g., UEs) and/or services (e.g., content distribution) of the core network provider.

Embodiments of the present disclosure can be used for purposes of both network resource to plan and promotion. By way of a nonlimiting example, the feature set clustering can be used to identify a new base station's geolocation and determine a campaign to promote products and/or services directed at users with network usage patterns corresponding to the new geolocation.

Embodiments of the present disclosure can provide information about one or more of the clusters in response to a telecommunications network management request. In accordance with one or more embodiments, the request can be a request for both network resource and demographic information.

Figure 7:
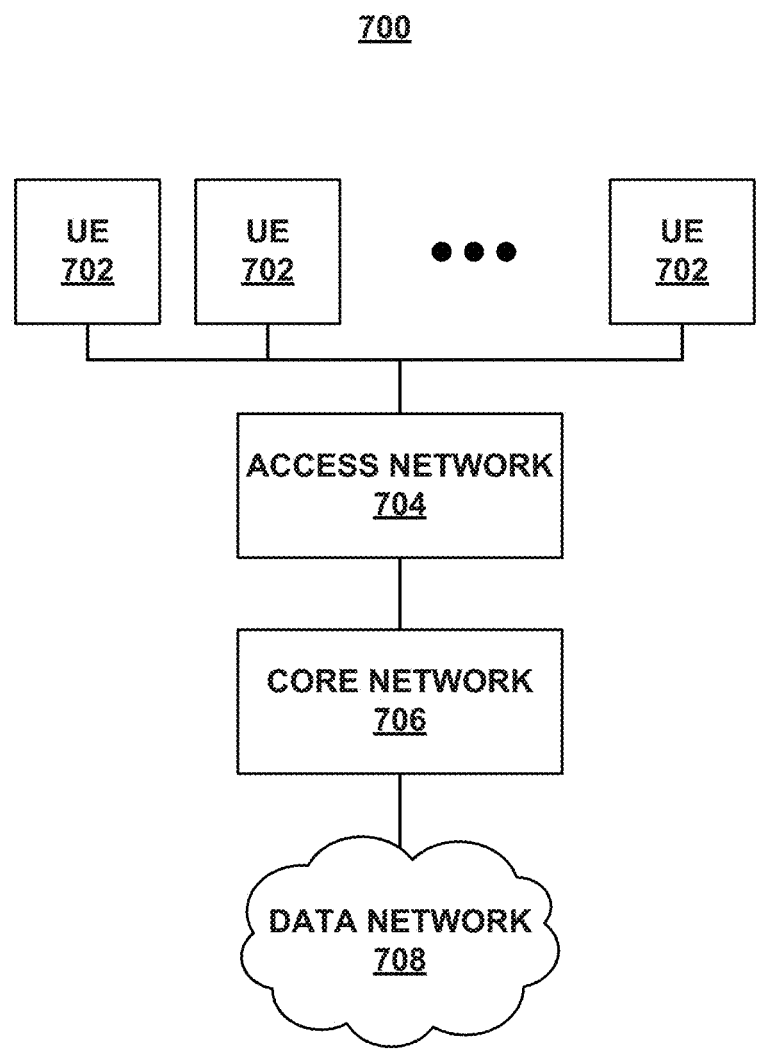
FIG. 7 is a block diagram of a telecommunications network in accordance with one or more embodiments of the present disclosure.

FIG. 7 is a block diagram of a telecommunications network according to one or more embodiments of the present disclosure.

As illustrated, a system 700 includes UE 702 that accesses a data network 708 via an access network 704 and a core network 706. In the illustrated embodiment, UE 702 comprises any computing device capable of communicating with the access network 704. As examples, UE 702 may include mobile phones, smartphones, tablets, laptops, sensors, Internet of Things (IoT) devices, and any other devices equipped with a cellular transceiver. One example of a UE is provided in FIG. 10.

In the illustrated embodiment, the access network 704 comprises a network allowing over-the-air network communication with UE 702. In general, the access network 704 includes at least one base station (such as and without limitation one or more of the base stations discussed herein) that is communicatively coupled to the core network 706 and wirelessly coupled to UE 702.

In one embodiment, the access network 704 comprises a fifth-generation (5G) cellular access network. In one embodiment, the access network 704 and UE 702 comprise a NextGen Radio Access Network (NG-RAN). In an embodiment, the access network 704 includes a plurality of next Generation Node B (gNodeB) base stations connected to UE 702 via an air interface. In one embodiment, the air interface comprises a New Radio (NR) air interface. In some embodiments, an NR interface utilizes a Cyclic Prefix Orthogonal Frequency-Division Multiple Access (CP-OFDM) downlink modulation scheme and either CP-OFDM or Discrete Fourier Transform Spread Orthogonal Frequency Division Multiplexing (DFT-s-OFDM) uplink modulation scheme. In these embodiments, the gNodeB provides all functionality to implement and operate the air interface and negotiates uplinks and downlinks with the UE 702. The gNodeB may additionally include multiple network interfaces for communicating with the core network 706. In one embodiment, the gNodeB includes an interface to communicate with a mobility manager (e.g., an Access Management Function, or AMF) and a second interface to communicate with one or more gateway elements in the core network 706, such as a Session Management Function (SMF) for control data or a User Plane Function (UPF) for user data. In one embodiment, the mobility manager manages control plane traffic while the gateway elements manage user data traffic, as discussed herein. In some embodiments, base stations in the access network 704 are communicatively connected. For example, in a 5G network, individual gNodeB devices can be communicatively coupled via an X2 interface.

In one embodiment, the access network 704 comprises a fourth-generation (4G) cellular access network. In some embodiments, the access network 704 comprises a Long-Term Evolution (LTE) access network. In one embodiment, the access network 704 and UE 702 comprise an Evolved Universal Mobile Telecommunications System (UMTS) Terrestrial Radio Access Network (E-UTRAN). In an embodiment, the access network 704 includes a plurality of Evolved Node B (eNodeB) base stations connected to UE 702 via an air interface. In one embodiment, the air interface comprises an E-UTRAN Uu or LTE Uu radio air interface. In some embodiments, an E-UTRAN Uu interface utilizes an orthogonal frequency-division multiple access (OFDMA) downlink modulation scheme and a single-carrier frequency-division multiple access (SC-FDMA) uplink modulation scheme. In these embodiments, the eNodeB provides all functionality to implement and operate the air interface and negotiates uplinks and downlinks with the UE 702. The eNodeB may additionally include multiple network interfaces for communicating with the core network 706. In one embodiment, the eNodeB includes an interface to communicate with a mobility manager (e.g., a Mobility Management Entity, MME) and a second interface to communicate with one or more gateway elements in the core network 706, such as an S-GW or P-GW. In one embodiment, the mobility manager manages control plane traffic while the gateway elements manage user data traffic, as will be discussed. In some embodiments, base stations in the access network 704 are communicatively connected. For example, in a 4G network, individual eNodeB devices can be communicatively coupled, for example, via an X2 interface or any other interface.

In some embodiments, the access network 704 may operate in a dual-connectivity mode wherein UE 702 connects to multiple base stations in the access network 704 simultaneously. In some embodiments, dual connectivity may be implemented via New Radio Dual Connectivity (NR-DC), E-UTRA-NR Dual Connectivity (EN-DC), NG-RAN-E-UTRA-NR Dual Connectivity (NGEN-DC), or NR-E-UTRA Dual Connectivity (NE-DC).

In the illustrated embodiment, the access network 704 provides access to a core network 706 to the UE 702. In the illustrated embodiment, the core network may be owned and/or operated by a mobile network operator (MNO) and provides wireless connectivity to UE 702. In the illustrated embodiment, this connectivity may comprise voice and data services. The core network 706 includes various computing devices, which are described briefly herein. Further detail of such devices is provided in FIG. 10.

At a high level, the core network 706 may include a user plane and a control plane. In one embodiment, the control plane comprises network elements and communications interfaces to allow for the management of user connections and sessions. By contrast, the user plane may comprise network elements and communications interfaces to transmit user data from UE 702 to elements of the core network 706 and to external network-attached elements in a data network 708 such as the Internet. An example of a control plane function comprises authenticating that a user can access the core network 706 (i.e., is a subscriber to the MNO). An example of a user plane function is the request and receipt of data from an external web server (e.g., via a web browser on a UE). Many other examples exist in a 4G or 5G network, and the foregoing examples are not intended to be limiting.

Generally, the core network 706 may include a mobility manager, one or more gateways (e.g., a serving gateway and packet gateway), and a subscriber database. In practice, the core network 706 may include more components than these. In a 4G network, the mobility manager may be implemented by an MME, the serving gateway by an S-GW, the packet gateway by a P-GW, and the subscriber database by a Home Subscriber Server (HSS). In a 5G network, the mobility manager may be implemented by an AMF, Session Management Function (SMF), and an Authentication Server Function (AUSF). Specifically, the AMF performs mobility management while the SMF performs session management, both of which are described herein. Further, the AUSF can obtain authentication vectors from a subscriber database. In a 4G network, the MME can perform all these functions. The 4G serving gateway (S-GW) in a 5G network may be implemented by the SMF as well. Specifically, packet routing from the base station to the packet gateway may be handled by the SMF in contrast to the S-GW in a 4G network. In a 5G network, the packet gateway function user plane may be implemented by the UPF, which provides packet routing from the serving gateway to external services and manages Internet Protocol (IP) address allocation as well as content filtering and blocking. In a 5G network, the subscriber database may be implemented by a Unified Data Repository (UDR), which stores the subscriber data. Access to the UDR may be mediated by a Unified Data Management (UDM) function, which is part of the subscriber database, as described herein.

In brief, a UE 702 communicates with the mobility manager to authenticate and establish a session or bearer with the serving and packet gateways. The mobility manager accesses the subscriber data to confirm the UE 702 identity and communicates with the serving gateway to establish the session. Once established, the UE 702 transmits data requests through the session to the packet gateway, which manages the transmitting and receiving data to and from external network services. Specific details of these elements are provided in the following figures.

In the illustrated embodiment, the access network 704 and the core network 706 are operated by an MNO. However, in some embodiments, networks 704, 706 may be operated by a private entity and may be closed to public traffic. For example, the components of the core network 706 may be provided as a single device, and the access network 704 may comprise a small form-factor base station. In these embodiments, the operator of the device can simulate a cellular network, and UE 702 can connect to this network akin to connecting to a national or regional network.

Figure 8:
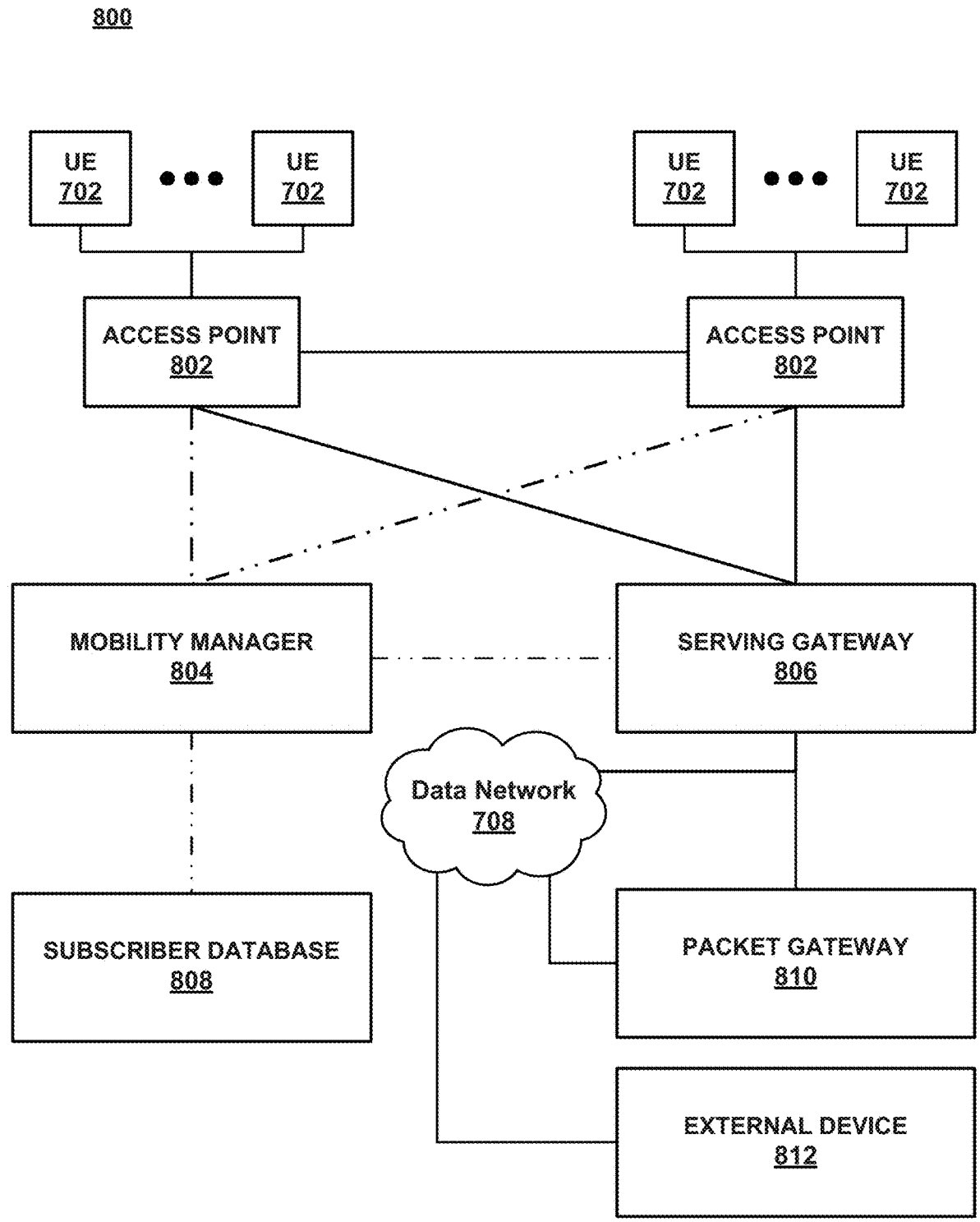
FIG. 8 is a block diagram illustrating a cellular network in accordance with one or more embodiments of the present disclosure.

FIG. 8 is a block diagram illustrating a cellular network in accordance with one or more embodiments of the present disclosure.

In the illustrated embodiment, a system 800 includes UE 702 communicatively connected to access points 802. As seen in FIG. 8, the access points 802 form an access network such as access network 704. In one embodiment, the access points 802 and UE 702 comprise a NextGen Radio Access Network (NG-RAN). In an embodiment, access points 802 comprise a plurality of gNodeB base stations connected to UE 702 via an air interface. In one embodiment, the air interface comprises a New Radio (NR) air interface. The gNodeB additionally includes multiple network interfaces for communicating with the core network and, specifically, mobility manager 804 and serving gateway 806. In one embodiment, the mobility manager 804 in a 5G network comprises an AMF. In one embodiment, the serving gateway 806 comprises an SMF for control data or UPF for user data.

In another embodiment, access points 802 comprise eNodeB base stations connected to UE 702 via an air interface. In some embodiments, the air interface comprises an E-UTRAN Uu or LTE Uu radio air interface. In these embodiments, the eNodeB provides all functionality to implement and operate the air interface and negotiates uplinks and downlinks with the UE 702. The eNodeB additionally includes multiple network interfaces for communicating with the core network and, specifically, mobility manager 804 and serving gateway 806. In one embodiment, the mobility manager 804 comprises an MME in a 4G network. In the illustrated embodiment, solid lines between network elements 804, 806, 808, 810 represent user data traffic, while dashed lines between network elements 804, 806, 808, 810 represent control or Non-Access Stratum (NAS) traffic.

In the illustrated embodiment, the mobility manager 804 manages control plane traffic while the gateway elements 806, 810 manage user data traffic. Specifically, the mobility manager 804 may comprise hardware or software for handling network attachment requests from UE 702. As part of processing these requests, the mobility manager 804 can access a subscriber database 808. The subscriber database 808 comprises hardware or software that stores user authorization and authentication data and validates users to the network. In some embodiments, the subscriber database 808 may comprise a UDM and UDR in a 5G network. In another embodiment, the subscriber database 808 may comprise an HSS in a 4G network. In one embodiment, the subscriber database 808 may also store a location of the user updated via a Diameter or similar protocol.

The mobility manager 804 may also be configured to create data sessions or bearers between UE 702 and serving gateway 806 or gateway 810. In one embodiment, the serving gateway 806 and gateway 810 may comprise single or separate devices. In general, the serving gateway 806 routes and forwards user data packets while also acting as the mobility anchor for the user plane during access point handovers and as the anchor for mobility between different network technologies. For idle state UE 702, the serving gateway 806 terminates the downlink data path and triggers paging when downlink data arrives for the UE 702. The serving gateway 806 manages and stores UE 702 contexts, e.g., parameters of the IP bearer service, network internal routing information. In a 5G network, the serving gateway 806 may be implemented by an SMF. In a 4G network, the serving gateway 806 may be implemented by an S-GW.

The serving gateway 806 is communicatively coupled to a gateway 810. In general, the gateway 810 provides connectivity from the UE 702 to external Packet Data Networks (PDNs) such as data network 708 by being the point of exit and entry of traffic to external networks (e.g., 708). UE 702 may have simultaneous connectivity with a plurality of gateways, including gateway 810 for accessing multiple packet data networks. The gateway 810 performs policy enforcement, packet filtering for each user, charging support, lawful interception, and packet screening. In the illustrated embodiment, gateway 810 also limits access to endpoints such as an external device 812. In a 5G network, the gateway 810 may be implemented by a User Plane Function (UPF). In a 4G network, the gateway 810 may be implemented by a P-GW.

In the illustrated embodiment, an external device 812 is communicatively coupled to the core network via the data network 708. In one embodiment, the data network 708 may comprise the Internet. In the illustrated embodiment, the external device 812, such as an application server, may comprise any electronic device capable of communicating with the data network 708, and the disclosure is not limited to specific types of network devices.

Figure 9:
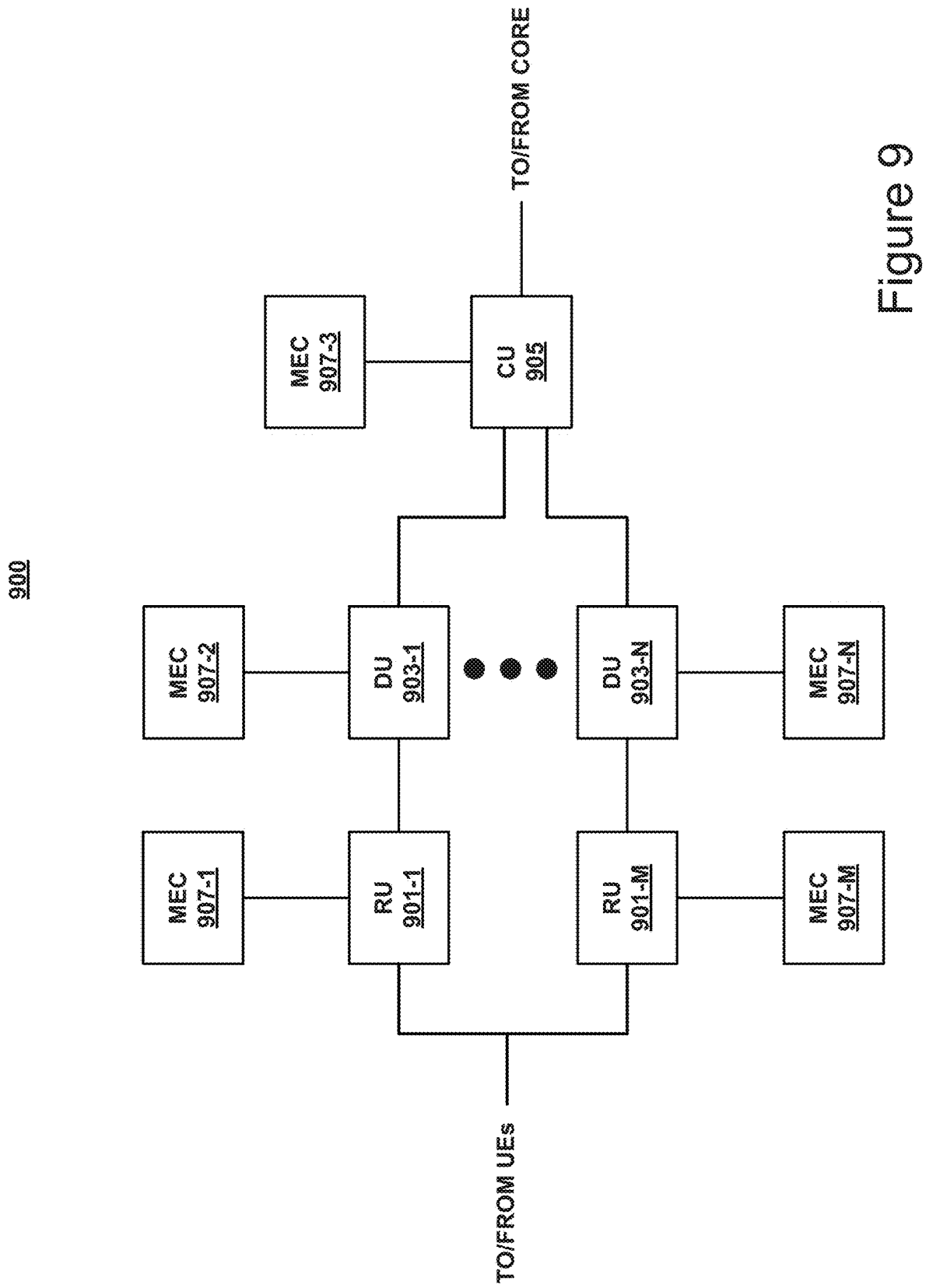
FIG. 9 illustrates an example Distributed Unit ("DU") network in accordance with one or more embodiments of the present disclosure.

In accordance with one or more embodiments, one or more gNodeBs of a 5G RAN can correspond to a Distributed Unit (DU) network. FIG. 9 illustrates an example Distributed Unit ("DU") network 900. In accordance with one or more embodiments, DU network 900 can be included in and/or implemented by one or more RANs. In some embodiments, a particular RAN may include one DU network 900. In some embodiments, a particular RAN may include multiple DU networks 900. In some embodiments, DU network 900 may correspond to one or more other types of base stations of one or more other types of RANs.

As shown, DU network 900 may include Central Unit ("CU") 905, one or more Distributed Units ("DUs") 903-1 through 903-N (referred to individually as "DU 903," or collectively as "DUs 903"), and one or more Radio Units ("RUs") 901-1 through 901-M (referred to individually as "RU 901," or collectively as "RUs 901").

CU 905 may communicate with a core of a wireless network (e.g., may communicate with one or more of the devices or systems of a core network, such as core network 706). In the uplink direction (e.g., for traffic from UEs 702 to the core network), CU 905 may aggregate traffic from DUs 903, and forward the aggregated traffic to the core network. In some embodiments, CU 905 may receive traffic according to a given protocol (e.g., Radio Link Control ("RLC")) from DUs 903, and may perform higher-layer processing (e.g., may aggregate/process RLC packets and generate Packet Data Convergence Protocol ("PDCP") packets based on the RLC packets) on the traffic received from DUs 903.

In accordance with some embodiments, CU 905 may receive downlink traffic (e.g., traffic from the core network) for a particular UE 702, and may determine which DU(s) 903 should receive the downlink traffic. DU 903 may include one or more devices that transmit traffic between a core network (e.g., via CU 905) and UE 702 (e.g., via a respective RU 901). DU 903 may, for example, receive traffic from RU 901 at a first layer (e.g., physical ("PHY") layer traffic, or lower PHY layer traffic), and may process/aggregate the traffic to a second layer (e.g., upper PHY and/or RLC). DU 903 may receive traffic from CU 905 at the second layer, may process the traffic to the first layer, and provide the processed traffic to a respective RU 901 for transmission to UE 702.

RU 901 may include hardware circuitry (e.g., one or more RF transceivers, antennas, radios, and/or other suitable hardware) to communicate wirelessly (e.g., via an RF interface) with one or more UEs 702, one or more other DUs 903 (e.g., via RUs 901 associated with DUs 903), and/or any other suitable type of device. In the uplink direction, RU 901 may receive traffic from UE 702 and/or another DU 903 via the RF interface and may provide the traffic to DU 903. In the downlink direction, RU 901 may receive traffic from DU 903, and may provide the traffic to UE 702 and/or another DU 903.

RUs 901 may, in some embodiments, be communicatively coupled to one or more Multi-Access/Mobile Edge Computing ("MEC") devices, referred to sometimes herein simply as ("MECs") 907. For example, RU 901-1 may be communicatively coupled to MEC 907-1, RU 901-M may be communicatively coupled to MEC 907-M, DU 903-1 may be communicatively coupled to MEC 907-2, DU 903-N may be communicatively coupled to MEC 907-N, CU 905 may be communicatively coupled to MEC 907-3, and so on. MECs 907 may include hardware resources (e.g., configurable or provisionable hardware resources) that may be configured to provide services and/or otherwise process traffic to and/or from UE 702, via a respective RU 901.

For example, RU 901-1 may route some traffic, from UE 702, to MEC 907-1 instead of to a core network (e.g., via DU 903 and CU 905). MEC 907-1 may process the traffic, perform one or more computations based on the received traffic, and may provide traffic to UE 702 via RU 901-1. In this manner, ultra-low latency services may be provided to UE 702, as traffic does not need to traverse DU 903, CU 905, and an intervening backhaul network between DU network 900 and the core network.

Figure 10:
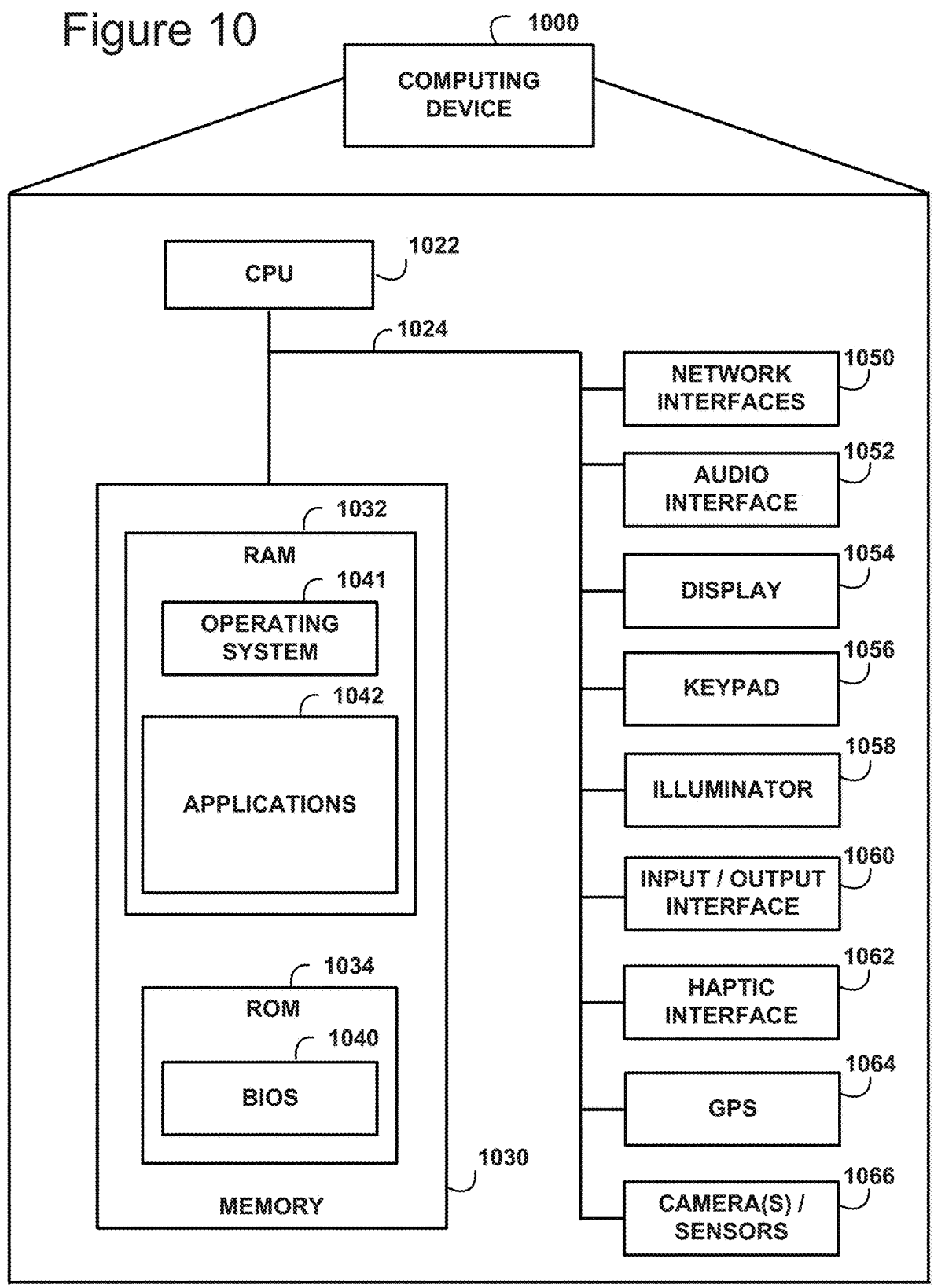
FIG. 10 provides a block diagram illustrating a computing device showing an example of client or server device used in accordance with one or more embodiments of the present disclosure.

FIG. 10 is a block diagram illustrating a computing device showing an example of a client device (e.g., UE 702) or server device used in the various embodiments of the disclosure. In accordance with one or more embodiments, modules of analysis engine 116 described herein can be implemented on one or more computing devices.

The computing device 1000 may include more or fewer components than those shown in FIG. 10, depending on the deployment or usage of the device 1000. For example, a server computing device, such as a rack-mounted server, may not include audio interfaces 1052, displays 1054, keypads 1056, illuminators 1058, haptic interfaces 1062, GPS receivers 1064, or cameras/sensors 1066. Some devices may include additional components not shown, such as graphics processing unit (GPU) devices, cryptographic co-processors, artificial intelligence (AI) accelerators, or other peripheral devices.

As shown in FIG. 10, the device 1000 includes a central processing unit (CPU) 1022 in communication with a mass memory 1030 via a bus 1024. The computing device 1000 also includes one or more network interfaces 1050, an audio interface 1052, a display 1054, a keypad 1056, an illuminator 1058, an input/output interface 1060, a haptic interface 1062, an optional global positioning systems (GPS) receiver 1064 and a camera(s) or other optical, thermal, or electromagnetic sensors 1066. Device 1000 can include one camera/sensor 1066 or a plurality of cameras/sensors 1066. The positioning of the camera(s)/sensor(s) 1066 on the device 1000 can change per device 1000 model, per device 1000 capabilities, and the like, or some combination thereof.

In some embodiments, the CPU 1022 may comprise a general-purpose CPU. The CPU 1022 may comprise a single-core or multiple-core CPU. The CPU 1022 may comprise a system-on-a-chip (SoC) or a similar embedded system. In some embodiments, a GPU may be used in place of, or in combination with, a CPU 1022. Mass memory 1030 may comprise a dynamic random-access memory (DRAM) device, a static random-access memory device (SRAM), or a Flash (e.g., NAND Flash) memory device. In some embodiments, mass memory 1030 may comprise a combination of such memory types. In one embodiment, the bus 1024 may comprise a Peripheral Component Interconnect Express (PCIe) bus. In some embodiments, the bus 1024 may comprise multiple busses instead of a single bus.

Mass memory 1030 illustrates another example of computer storage media for the storage of information such as computer-readable instructions, data structures, program modules, or other data. Mass memory 1030 stores a basic input/output system ("BIOS") 1040 (e.g., as part of ROM 1034) for controlling the low-level operation of the computing device 1000. The mass memory also stores an operating system 1041 for controlling the operation of the computing device 1000.

Applications 1042 may include computer-executable instructions which, when executed by the computing device 1000, perform any of the methods (or portions of the methods) described previously in the description of the preceding Figures. In some embodiments, the software or programs implementing the method embodiments can be read from a hard disk drive (not illustrated) and temporarily stored in RAM 1032 by CPU 1022. CPU 1022 may then read the software or data from RAM 1032, process them, and store them to RAM 1032 again.

The computing device 1000 may optionally communicate with a base station (not shown) or directly with another computing device. Network interface 1050 is sometimes known as a transceiver, transceiving device, or network interface card (NIC).

The audio interface 1052 produces and receives audio signals such as the sound of a human voice. For example, the audio interface 1052 may be coupled to a speaker and microphone (not shown) to enable telecommunication with others or generate an audio acknowledgment for some action. Display 1054 may be a liquid crystal display (LCD), gas plasma, light-emitting diode (LED), or any other type of display used with a computing device. Display 1054 may also include a touch-sensitive screen arranged to receive input from an object such as a stylus or a digit from a human hand.

Keypad 1056 may comprise any input device arranged to receive input from a user. Illuminator 1058 may provide a status indication or provide light.

The computing device 1000 also comprises an input/output interface 1060 for communicating with external devices, using communication technologies, such as USB, infrared, Bluetooth™, or the like. The haptic interface 1062 provides tactile feedback to a user of the client device.

The optional GPS transceiver 1064 can determine the physical coordinates of the computing device 1000 on the surface of the Earth, which typically outputs a location as latitude and longitude values. GPS transceiver 1064 can also employ other geo-positioning mechanisms, including, but not limited to, triangulation, assisted GPS (AGPS), E-OTD, CI, SAI, ETA, BSS, or the like, to further determine the physical location of the computing device 1000 on the surface of the Earth. In one embodiment, however, the computing device 1000 may communicate through other components, provide other information that may be employed to determine a physical location of the device, including, for example, a MAC address, IP address, or the like.

The present disclosure has been described with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, the subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment, and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms such as "and," "or," or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, a non-transitory computer-readable medium (or computer-readable storage medium/media) stores computer data, which data can include computer program code (or computer-executable instructions) that is executable by a computer, in machine-readable form. By way of example, and not limitation, a computer-readable medium may comprise computer-readable storage media, for tangible or fixed storage of data, or communication media for transient interpretation of code-containing signals. Computer-readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer-readable storage media can tangibly encode computer-executable instructions that when executed by a processor associated with a computing device perform functionality disclosed herein in connection with one or more embodiments.

Computer-readable storage media includes, but is not limited to, RAM, ROM, EPROM, EEPROM, flash memory or other solid-state memory technology, CD-ROM, DVD, or other optical storage, cloud storage, magnetic storage devices, or any other physical or material medium which can be used to tangibly store thereon the desired information or data or instructions and which can be accessed by a computer or processor.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user," "subscriber," "consumer," or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

In the preceding specification, various example embodiments have been described with reference to the accompanying drawings. However, it will be evident that various modifications and changes may be made thereto, and additional embodiments may be implemented without departing from the broader scope of the disclosed embodiments as set forth in the claims that follow. The specification and drawings are accordingly to be regarded in an illustrative rather than restrictive sense.

The invention claimed is:

1. A method comprising:
obtaining, by a computing device, network access data identifying network access of a plurality of users, the network access data comprising information for each of the plurality of users related to an aggregate time spent in relation to a region and corresponding base station;
obtaining, by the computing device, user data for the plurality of users;
analyzing, by the computing device, the obtained network access data, and determining a network usage pattern for each user;
determining, by the computing device, a plurality of feature sets corresponding to the plurality of users, a feature set determined for a respective user comprising network usage features in accordance with the network usage pattern determined for the respective user and user features determined using the user data obtained for the respective user, the network usage features for the respective user comprise information about a region and base station related to an aggregate time spent for the respective user;
determining, by the computing device, a number of clusters formed using the plurality of feature sets, each cluster grouping a number of users, of the plurality of users, having similar feature sets; and
communicating, by the computing device, information about at least one cluster of the determined number of clusters in response to a network analysis request, the information about the at least one cluster comprising the network usage features for users within the at least one cluster, the information about the at least one cluster further comprising user information from the user data of the users within the at least one cluster.

2. The method of claim 1, further comprising:
receiving, by the computing device, the network analysis request comprising criteria for selection of the at least one cluster; and
selecting, by the computing device, the at least one cluster using the criteria.

3. The method of claim 2, wherein the selection criteria comprises network usage pattern criteria, user data criteria or a combination of network usage and user data criteria, and wherein the at least one cluster satisfies the selection criteria.

4. The method of claim 2, wherein the network usage pattern selection criteria comprises information identifying at least one usage pattern, and the at least one cluster satisfies the network usage pattern selection criteria.

5. The method of claim 4, wherein the network usage pattern selection criteria comprises information identifying at least one region associated with at least one base station of a plurality of base stations of the access network.

6. The method of claim 2, wherein the user data selection criteria comprises information identifying at least one demographic feature.

7. The method of claim 6, wherein the user data selection criteria comprises information identifying at least one user interest.

8. The method of claim 1, further comprising:
analyzing, by the computing device, the obtained network access data to identify network accesses of the respective user;
determining, by the computing device, a number of aggregate time spent values using the identified network accesses, each aggregate time spent value corresponding to a region associated with a base station of a plurality of base stations of the access network;
ranking, by the computing device, the number of aggregate time spent values; and
selecting, by the computing device, the aggregate time spent for the respective user using the determined ranking.

9. The method of claim 1, further comprising:
determining, by the computing device, the region corresponding to each time spent value based on a distance determined using a geolocation of the user and a geolocation of the associated base station.

10. The method of claim 9, wherein the region is further based on a direction determined using the geolocation of the user and the geolocation of the associated base station.

11. The method of claim 1, wherein the network access data relates to 5G, C-band coverage of an access network of the network.

12. A non-transitory computer-readable storage medium tangibly encoded with computer-executable instructions that when executed by a processor associated with a computing device perform a method comprising:
obtaining network access data identifying network access of a plurality of users, the network access data comprising information for each of the plurality of users related to an aggregate time spent in relation to a region and corresponding base station;
obtaining user data for the plurality of users;
analyzing the obtained network access data, and determining a network usage pattern for each user;
determining a plurality of feature sets corresponding to the plurality of users, a feature set determined for a respective user comprising network usage features in accordance with the network usage pattern determined for the respective user and user features determined using the user data obtained for the respective user, the network usage features for the respective user comprise information about a region and base station related to an aggregate time spent for the respective user;
determining a number of clusters formed using the plurality of feature sets, each cluster grouping a number of users, of the plurality of users, having similar feature sets; and
communicating information about at least one cluster of the determined number of clusters in response to a network analysis request, the information about the at least one cluster comprising the network usage features for users within the at least one cluster, the information about the at least one cluster further comprising user information from the user data of the users within the at least one cluster.

13. The non-transitory computer-readable storage medium of claim 12, the method further comprising:
    receiving the network analysis request comprising criteria for selection of the at least one cluster; and
    selecting the at least one cluster using the criteria.

14. The non-transitory computer-readable storage medium of claim 13, wherein the selection criteria comprises network usage pattern criteria, user data criteria or a combination of network usage and user data criteria, and wherein the at least one cluster satisfies the selection criteria.

15. The non-transitory computer-readable storage medium of claim 13, wherein the network usage pattern selection criteria comprises information identifying at least one usage pattern, and the at least one cluster satisfies the network usage pattern selection criteria.

16. The non-transitory computer-readable storage medium of claim 15, wherein the network usage pattern selection criteria comprises information identifying at least one region associated with at least one base station of a plurality of base stations of the access network.

17. The non-transitory computer-readable storage medium of claim 13, wherein the user data selection criteria comprises information identifying at least one demographic feature.

18. The non-transitory computer-readable storage medium of claim 17, wherein the user data selection criteria comprises information identifying at least one user interest.

19. A device comprising:
a processor, configured to:
    obtain network access data identifying network access of a plurality of users, the network access data comprising information for each of the plurality of users related to an aggregate time spent in relation to a region and corresponding base station;
    obtain user data for the plurality of users;
    analyze the obtained network access data, and determine a network usage pattern for each user;
    determine a plurality of feature sets corresponding to the plurality of users, a feature set determined for a respective user comprising network usage features in accordance with the network usage pattern determined for the respective user and user features determined using the user data obtained for the respective user, the network usage features for the respective user comprise information about a region and base station related to an aggregate time spent for the respective user;
    determine a number of clusters formed using the plurality of feature sets, each cluster grouping a number of users, of the plurality of users, having similar feature sets; and
    communicate information about at least one cluster of the determined number of clusters in response to a network analysis request, the information about the at least one cluster comprising the network usage features for users within the at least one cluster, the information about the at least one cluster further comprising user information from the user data of the users within the at least one cluster.

\* \* \* \* \*